US012792863B2

(12) United States Patent
Patil et al.

(10) Patent No.: US 12,792,863 B2
(45) Date of Patent: Nov. 10, 2026

(54) REMOTE READING SIGNALING AND SESSION MANAGEMENT

(71) Applicant: QUALCOMM Incorporated, San Diego, CA (US)

(72) Inventors: Kiran Patil, San Diego, CA (US); Bhupesh Manoharlal Umatt, San Diego, CA (US); Sheng-Yuan Tu, San Diego, CA (US); Qi Fu, San Diego, CA (US); Venkatraman Rajagopalan, San Diego, CA (US); Joseph Patrick Burke, Carlsbad, CA (US); Vivek Mehta, San Diego, CA (US); Rishav Rej, Pleasanton, CA (US); Qingxin Chen, San Diego, CA (US); Ajay Vignesh Jayaprakash, San Diego, CA (US); Scott Hoover, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/192,181

(22) Filed: Apr. 28, 2025

(65) Prior Publication Data

US 2026/0340332 A1 Oct. 29, 2026

(51) Int. Cl.

| | |
|---|---|
| ***G06K 17/00*** | (2006.01) |
| ***G06Q 10/087*** | (2023.01) |
| ***H04W 84/12*** | (2009.01) |

(52) U.S. Cl.

CPC ....... *G06K 17/0029* (2013.01); *G06Q 10/087* (2013.01); *H04W 84/12* (2013.01)

(58) Field of Classification Search

CPC .................................................... H04W 74/04

USPC ........................................ 340/10.3; 235/385

See application file for complete search history.

(56) References Cited

U.S. PATENT DOCUMENTS

| | | | | |
|---|---|---|---|---|
| 12,321,804 | B2 * | 6/2025 | Wilkinson | G06K 7/10099 |
| 2014/0084060 | A1 * | 3/2014 | Jain | G06Q 10/087 235/385 |
| 2025/0007568 | A1 * | 1/2025 | Tang | H01Q 15/148 |
| 2026/0044816 | A1 * | 2/2026 | Butler | G06Q 10/087 |

* cited by examiner

*Primary Examiner* — Allyson N Trail

(74) *Attorney, Agent, or Firm* — Polsinelli

(57) ABSTRACT

Systems and techniques are described herein for wireless communication. For example, a computing device can identify a first tag from a plurality of tags. The computing device can determine a tag identifier associated with the first tag. The computing device can determine, based on the tag identifier, a command configured to cause the first tag to store a state variable of the first tag in a non-transitory memory of the first tag. The computing device can transmit the command to the first tag.

20 Claims, 12 Drawing Sheets

REMOTE READING SIGNALING AND SESSION MANAGEMENT

FIELD

The present disclosure generally relates to wireless communication using remote reading systems (e.g., Radio Frequency Identification (RFID) systems). For example, aspects of the present disclosure relate to systems and techniques for remote reading (e.g., RFID) signaling and session management (e.g., management of RFID concurrencies with wireless technologies).

BACKGROUND

Ambient energy harvesting devices (e.g., ambient Internet of Things (IoT) devices) can operate without an energy storage element and/or can be provided with a relatively small energy storage element (e.g., battery, capacitor, etc.) by harvesting energy from incident downlink Radio Frequency (RF) signals (e.g., transmitted by an energy source network device such as a base station, gNB, etc.). Ambient energy harvesting devices provided without an energy storage element can include passive IoT devices. Ambient energy harvesting devices provided with a relatively small energy storage element may include semi-passive IoT devices. Ambient energy harvesting devices that are provided with an energy storage element can include active IoT devices. Energy harvesting can be implemented in remote tag (e.g., an RFID tag) or various other remote tags to power the remote tags (e.g., RFID devices for powering RFID tags).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some aspects, an apparatus for wireless communications is provided. The apparatus includes at least one memory and at least one processor coupled to the at least one memory and configured to: identify a first tag from a plurality of tags; determine a tag identifier associated with the first tag; determine, based on the tag identifier, a command configured to cause the first tag to store a state variable of the first tag in a non-transitory memory of the first tag; and transmit the command to the first tag.

In some aspects, an apparatus for wireless communications is provided. The apparatus includes at least one memory and at least one processor coupled to the at least one memory and configured to: receive a first command from a remote tag reader; transmit, by a remote tag, a remote tag identifier based on the first command; and adjust a state variable of the remote tag in a non-transitory memory of the remote tag based on a second command from the remote tag reader.

In some aspects, a method for wireless communications is provided. The method includes: identifying a first tag from a plurality of tags; determining a tag identifier associated with the first tag; determining, based on the tag identifier, a command configured to cause the first tag to store a state variable of the first tag in a non-transitory memory of the first tag; and transmitting the command to the first tag.

In some aspects, a method for wireless communications is provided. The method includes: receiving a first command from a remote tag reader; transmitting, by a remote tag, a remote tag identifier based on the first command; and adjusting a state variable of the remote tag in a non-transitory memory of the remote tag based on a second command from the remote tag reader.

In some aspects, a non-transitory computer-readable medium is provided having stored thereon instructions that, when executed by at least one processor, cause the at least one processor to: identify a first tag from a plurality of tags; determine a tag identifier associated with the first tag; determine, based on the tag identifier, a command configured to cause the first tag to store a state variable of the first tag in a non-transitory memory of the first tag; and transmit the command to the first tag.

In some aspects, a non-transitory computer-readable medium is provided having stored thereon instructions that, when executed by at least one processor, cause the at least one processor to: receive a first command from a remote tag reader; transmit, by a remote tag, a remote tag identifier based on the first command; and adjust a state variable of the remote tag in a non-transitory memory of the remote tag based on a second command from the remote tag reader.

In some aspects, an apparatus for wireless communication is provided. The apparatus includes: means for identifying a first tag from a plurality of tags; means for determining a tag identifier associated with the first tag; means for determining, based on the tag identifier, a command configured to cause the first tag to store a state variable of the first tag in a non-transitory memory of the first tag; and means for transmitting the command to the first tag.

In some aspects, an apparatus for wireless communication is provided. The apparatus includes: means for receiving a first command from a remote tag reader; means for transmitting, by a remote tag, a remote tag identifier based on the first command; and means for adjusting a state variable of the remote tag in a non-transitory memory of the remote tag based on a second command from the remote tag reader.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
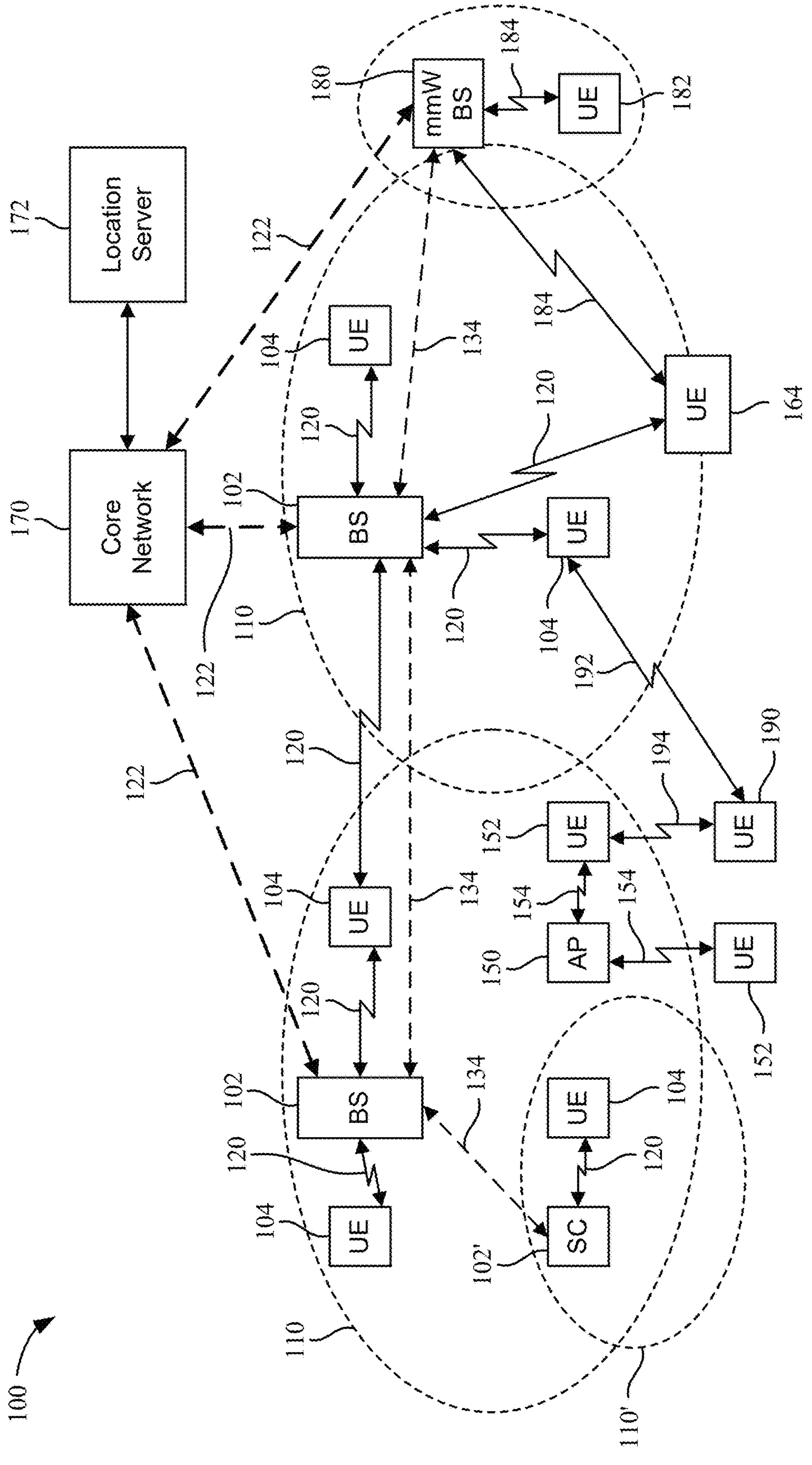
FIG. 1 is a block diagram illustrating an example of a wireless communication network, in accordance with aspects of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

As previously mentioned, ambient energy harvesting devices (e.g., ambient Internet of Things (IoT) devices) can operate without an energy storage element and/or can be provided with a relatively small energy storage element (e.g., battery, capacitor, etc.) by harvesting energy from incident downlink Radio Frequency (RF) signals (e.g., transmitted by an energy source network device such as a base station, gNB, etc.). Ambient energy harvesting devices provided without an energy storage element can include passive IoT devices. Ambient energy harvesting devices provided with a relatively small energy storage element may include semi-passive IoT devices. Ambient energy harvesting devices that are provided with an energy storage element can include active IoT devices. Energy harvesting can be implemented in remote tag (e.g., a Radio-Frequency Identification (RFID) tag) or various other remote tags to power the remote tags.

Energy harvesting devices (e.g., electronic or remote tags such as RFID tags) can harvest energy over-the-air to power their transmission and reception circuitry. For example, in some cases, energy harvesting devices can harvest energy from ambient downlink RF signals (e.g., including dedicated downlink RF signals for energy harvesting and various other downlink RF signals that are not dedicated energy harvesting signals). Based on harvesting energy from incident downlink radio frequency (RF) signals (e.g., transmitted by a network device, such as a reader device or an interrogator), ambient energy harvesting devices (e.g., passive IoT devices, which may be in the form of electronic or remote tags such as RFID tags) may be provided without an energy storage element and/or can be provided with a relatively small energy storage element (e.g., battery, capacitor, etc.). For example, energy harvesting devices (e.g., electronic tags) can operate without a battery at a low operating expense (OPEX), with a low maintenance cost, and with a long-life cycle. Ambient energy harvesting devices provided without an energy storage element may include passive IoT devices. Ambient energy harvesting devices provided with a relatively small energy storage element may include semi-passive IoT devices. Ambient energy harvesting devices that are provided with an energy storage element may include active IoT devices. Energy harvesting devices can be deployed at large scales, based on the simplification in their manufacture and deployment associated with implementing wireless energy harvesting.

In a wireless communication environment, a device (e.g., such as a reader device or interrogator) can be used to transmit downlink RF signals to energy harvesting devices. In one illustrative example, a reader device can read and/or write information stored on energy harvesting IoT devices (e.g., electronic tags, which may each be associated with a respective item) by transmitting the downlink RF signal. The downlink RF signal can provide energy to an energy harvesting IoT device. The energy harvesting IoT device can transmit (e.g., based on reflecting or backscattering a portion of the incident downlink RF signal) a response signal (e.g., an information-bearing uplink signal) back to the reader device, after the energy harvesting IoT device is sufficiently energized based on the downlink RF signal. The reader device can read the signal transmitted by an energy harvesting IoT device to decode the information transmitted by the IoT device (e.g., such as sensor information collected by one or more sensors included in the IoT device, etc.).

In some cases, an energy harvesting device can use the same antenna for energy harvesting and communications. For example, an energy harvesting device can use the same antenna to perform energy harvesting and backscatter communications, where the energy harvesting and the backscatter communications are based on the same downlink RF signal. In some examples, an energy harvesting device can include a first antenna used for energy harvesting and a second antenna used for communications, where the first antenna is different from the second antenna. For instance, an ambient IoT device can use the first antenna to perform energy harvesting and can use the second antenna to perform communication (e.g., transmitting and/or receiving).

Many energy harvesting devices (e.g., remote tag devices such as RFID tags/devices) use a backscatter transmitter to generate and transmit an uplink signal by reflecting and backscatter modulating an incident downlink signal using a first antenna. In some examples, an ambient IoT device can use a backscatter transmitter that is the same as or similar to a backscatter transmitter utilized by a passive or semi-passive IoT device. An active transmitter can use a battery or other energy storage element included in the ambient IoT device to generate and transmit an uplink signal, using an antenna that is different from the first antenna associated with the backscatter transmitter (e.g., a second antenna). To transmit an uplink signal, the backscatter transmitter of an ambient IoT device must first receive a downlink signal that can be reflected and backscatter modulated. For example, the backscatter transmitter may be unable to transmit an uplink signal unless or until a continuous sine wave is received as a downlink signal from a base station, gNB, or other energy source network device. The active transmitter of an ambient IoT device can perform uplink communication that is triggered by the ambient IoT device (e.g., without dependence on first receiving a downlink signal). In some examples, ambient IoT devices may include a small battery or energy storage element and may be unable to sustain longer periods of uplink communication using the active transmitter of the ambient IoT device. For example, active transmission by an ambient IoT device may quickly deplete the onboard battery or other energy storage element(s) included in the ambient IoT device.

An energy harvesting tag (EH-tag) system is an ambient IoT system. The system generally includes an energizer (e.g., a reader device or interrogator) and an electronic tag (e.g., which is a low-cost device). An electronic tag does not include a battery and relies on wireless power transfer (WPT) from over-the-air to perform energy harvesting (e.g., to harvest energy from the wireless signals transmitted from the energizer). The energizer can send a downlink wireless power transfer waveform (e.g., including a continuous waveform (CW)) to the electronic tags.

An example of an energy harvesting device (e.g., tag) is a remote tag, such as an RFID tag. Remote reading systems (e.g., RFID systems) are generally classified as short-range wireless communication. Remote reading system technologies (e.g., RFID technologies) provide wireless transfer of data between a remote reader (e.g., also referred to as a remote tag reader, such as a RFID reader device) and a remote tag or transponder (e.g., RFID tag). Remote reading systems (e.g., RFID systems) are generally used for identifying, inventorying, and tracking information associated with tagged physical objects (e.g., a box in a warehouse, items in a store, etc.).

As noted previously, remote reading systems (e.g., RFID systems) can be used for wireless communication between a reader device or remote tag reader (e.g., RFID reader) and one or more remote tags or transponders (e.g., RFID tags). A remote tag reader (e.g., an RFID reader) may also be referred to as an "interrogator" (e.g., an "RFID interrogator"), a "scanner" (e.g., an "RFID scanner"), and/or an "energizer." Remote reading systems (e.g., RFID systems) can be used to identify and/or track various items that are associated with one or more remote tags (e.g., various items to which one or more RFID tags are attached). Remote reading systems can read and/or write information to and/or from (respectively) remote tags (e.g., RFID tags), based on respective wireless communications between a remote tag reader and the remote tags (e.g., an RFID reader and the RFID tags).

Remote reading systems (e.g., RFID systems) and techniques are increasingly being implemented in portable electronic devices, such as smartphones, tablets, laptops, gaming systems, etc. by adding an RFID reader or other electronic components to the portable electronic devices. Many electronic devices, portable electronic devices included, are ill-equipped to perform RFID techniques, at least because of RFID requirements for swift (often on the scale of 2 milliseconds before reset) communications between RFID devices. The current EPC Radio Frequency Identity Generation-2 UHF RFID Standard uses transient state variables (e.g., inventoried flags) to indicate whether a remote tag (e.g., an RFID tag) has been inventoried by a remote tag reader (e.g., an RFID reader) which are reset after 2 milliseconds or upon loss of power.

The transient state variables can be problematic for electronic devices, such as portable electronic devices, because many remote reading systems are powered using energy harvesting techniques from downlink RF signals, meaning a lapse in communications between the electronic device and the remote reading system can result in the remote reading system powering down and resetting state variables. The resetting of state variables (e.g., flags indicating whether an RFID tag has been inventoried) can result from a lapse in communication, a delay in communications (e.g., communications between an RFID reader and an RFID tag beyond the 2-millisecond response time), or a loss in power of the remote tag (e.g., the RFID tag). Further, unintentional resetting of state variables can result in inefficiencies because indicators of whether a remote tag (e.g., an RFID tag) has already been inventoried is erased, requiring the remote tag and remote tag reader (e.g., RFID reader) to restart inventorying processes.

For example, remote tag readers (e.g., RFID readers) supporting concurrency can sometimes, in error or intentionally, temporarily stop transmissions to remote tags (e.g., RFID tags). In such an example, a remote tag reader (e.g., an RFID reader) that is part of a smartphone could temporarily stop transmissions to remote tags (e.g., RFID tags) to send a text, perform a phone call, etc. The temporary stop in transmissions can reset state variables of the remote tags requiring the remote tag reader to participate in procedures such as inventory again delaying other remote reading system (e.g., RFID) procedures.

For example, using an RFID reader as an example of a remote tag reader and RFID tags as examples of remote tags, an RFID reader (e.g., energizer) can be used to interrogate one or more RFID tags to obtain information of the nearby items that are within communication range of the RFID reader and the interrogation signal. The RFID reader (e.g., energizer) can transmit an RF signal to perform the energizing and interrogating of the RFID tags. An RFID tag that receives the interrogating RF wave can respond by backscattering (e.g., reflecting back) and/or transmitting another RF wave, as previously described. An RFID tag may generate the responsive RF wave originally (e.g., in examples where the RFID tag is an active or semi-active tag). An RFID tag may generate the responsive RF wave passively, for instance by reflecting back a portion of the interrogating RFID wave using a backscatter process (e.g., in examples where the RFID tag is a passive tag). The responsive RF wave can be referred to as the immediate RFID tag reply. The timing of the responsive RF wave can be tracked by the RFID reader during inventorying. For example, the RFID reader can include a threshold time for when the RFID reader anticipates the responsive RF wave. The threshold time can represent a time from interrogator (e.g., the RFID reader) transmission to the RFID tag (e.g., T1 of the Electronic Product Code (EPC) Generation 2 (e.g., Gen2) standards). Failure for the RFID tag or RFID reader to respond within threshold time periods, or a lapse in in RF signals to power the RFID tag can result in information stored in transient memory of the RFID tag to be lost. The loss of the information (e.g., information indicating a state of RFID tag or a step in an inventorying process of the RFID tag) can cause inventorying (and other RFID processes) to perform duplicative actions to set state variables of the RFID tags which were previously set before losing power.

Remote reading system (e.g., RFID) protocol time durations (e.g., thresholds) in inventorying are generally classified into two different classes. For example, an initial message sequence including a Select (T)/Challenge (T) message to one or more of a remote tags (e.g., RFID tags). In such an example, the sequence can be represented as a sequence of messages or commands from the perspective of the remote tag reader (e.g., RFID reader). In such an example, T represents transmissions from the remote tag reader (e.g., RFID reader) to the remote tags (e.g., RFID tags) and R represents messages or commands received by the remote tag reader. For example, the Select (T)/Challenge (T) represent messages or commands transmitted from the remote tag reader to the remote tags. In continuing the example, a sequence of messages representing back and forth communication between the remote tag reader and the one or more remote tags can be represented as Query(T) to RN16(R) (e.g., random number 16-digit response from a remote tag to the remote tag reader). The sequence can continue with ACK (T) (e.g., an acknowledgement message or command from the remote tag reader to the remote tag confirming receipt of the response (e.g., RFID response) which in this example is RN16(R)). The sequence can continue with EPC (R) representing transmission of a tag identifier associated with a remote tag (e.g., an RFID tag). The remote tag reader can store information associated with the tag identifier to indicate the remote tag has been inventoried.

Systems, apparatuses, methods (also referred to as processes), and computer-readable media (collectively referred to herein as "systems and techniques") are described herein that provide wireless communication techniques. For example, the wireless communication techniques can include communications between a remote tag reader (e.g., an RFID reader) and at least one remote tag (e.g., RFID tag), or another remote reading system device (e.g., RFID device). The remote tag reader can be part of an electronic device, such as a smartphone, tablet, laptop, gaming system, etc. The systems and techniques can be used to preserve inventorying actions performed by the remote tag reader of remote tags.

According to some aspects, a remote tag reader (e.g., an RFID reader) can perform various singulation techniques to identify (or singulate) a first remote tag (e.g., a first RFID tag) from a plurality of remote tags (e.g., RFID tags). For example, the remote tag reader can transmit RF signals to power one or more remote tags (including the first remote tag) from the plurality of remote tags. In further examples, the remote tag reader can transmit RF signals such as a command using a multicast transmission (e.g., a transmission to multiple remote tags). The remote tag reader can transmit a message or command to the remote tag. For example, the remote tag reader can transmit a command to the first remote tag to inventory the remote tag. For example, inventorying the remote tag can include indicating, through a state variable, flag, or register of the remote tag that the remote tag reader has communicated with the remote tag. In some examples, inventorying the remote tag can include identifying the remote tag is within a predetermined distance of the remote tag reader. In further examples, inventorying the remote tag can include transmitting a command to the remote tag to perform an action, and confirming, such as based on a response from the remote tag, that the action was performed. In further examples, the command can be a custom command to multiple tags (e.g., each tag of the first plurality of tags) with or without a select command. In some examples, the remote tag reader can power remote tags (e.g., RFID tags) by transmitting a continuous wave (CW) signal.

In some aspects, the remote tag reader can determine a tag identifier associated with the first tag. For example, tags can include identifiers associated with a manufacturer of the tag, a user of the tag, a model of the tag, etc. In some examples, the identifiers can include instructions associated with format of commands to transmit to the remote tag (e.g., from the remote tag reader). For example, a tag manufactured by a first manufacturer can use different formats or structures of commands to communicate with the tag than another tag manufactured by a second manufacturer. In some examples, the identifier can include a custom command to transmit to the remote tag. In some examples, the identifier can include data indicating a format of the custom command. The remote tag reader can transmit the custom command to the first remote tag and the plurality of remote tags.

The custom command can include instructions to the remote tag to save a state variable associated with whether the remote tag has been inventoried in persistent memory of the remote tag. In some examples, the persistent memory can be a non-transient memory of the remote tag, such as in solid state memory, a hard drive, or other non-transient memory. In some examples, such as where the remote tag is a component of another electronic device, the state variable can be saved at another electronic device associated with the remote tag. Saving the state variable associated with whether the remote tag has been inventoried can include adjusting a flag of the remote tag.

For example, the state variable can be a multi-state variable (e.g., a two-state variable). In such an example, the state variable can include a flag per session and a selected (SL) flag. The custom command can cause the remote tag or a component thereof to adjust values associated with the flag per session and the selected flag to indicate that the remote tag has been inventoried. The remote tag reader can identify the remote tag as being inventoried because the remote tag has already responded to a message from the remote tag reader. In further examples, the state variable can include at least one of an inventoried flag, a selected (SL) flag, a slot counter, a handle, or a query command. In some examples, the stored state variables can be applied to scenarios where the remote tag reader switches to non-RFID technologies (e.g., WAN communications) before switching back to RFID. In such an example, efficiency of the RFID resumption can be improved by reducing duplicative commands. For example, the RFID transmission gap (e.g., a period of time between commands received and transmitted between the remote tags and remote tag reader) can be caused by resource sharing between WAN and RFID of the remote tag reader. Storing the state variables can improve efficiency by reducing the duplicative commands.

In some examples, the state variables requested to be stored in memory of the tag can be requested to be stored without an explicit command. For example, the remote tags can be triggered to store state variables based triggering a persistence period of the remote tags based on CW being off and turning the CW on after a concurrency gap. In such an example, the remote tags can be configured to restore back all the stored state variables.

In some examples, the persistent memory can be memory configured to store the state variable for a longer period of time than the 2-millisecond standard of the EPC Radio Frequency Identity Generation-2 UHF RFID Standard. For example, the persistent memory can be memory configured to store the state variable for a predetermined period of time such as 2 seconds. In such an example, when a response from the first remote tag is not received by the remote tag reader (e.g., a suspend time or a pause time) exceeding the predetermined period of time, the remote tag reader can restart the inventory processes. Otherwise, the remote tag reader can resume the inventory process.

Various aspects of the present disclosure will be described with respect to the figures.

According to various aspects, FIG. 1 illustrates an example of a wireless communications system 100. The wireless communications system 100 (e.g., which may also be referred to as a wireless wide area network (WWAN) or a wide area network (WAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or another receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 102 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
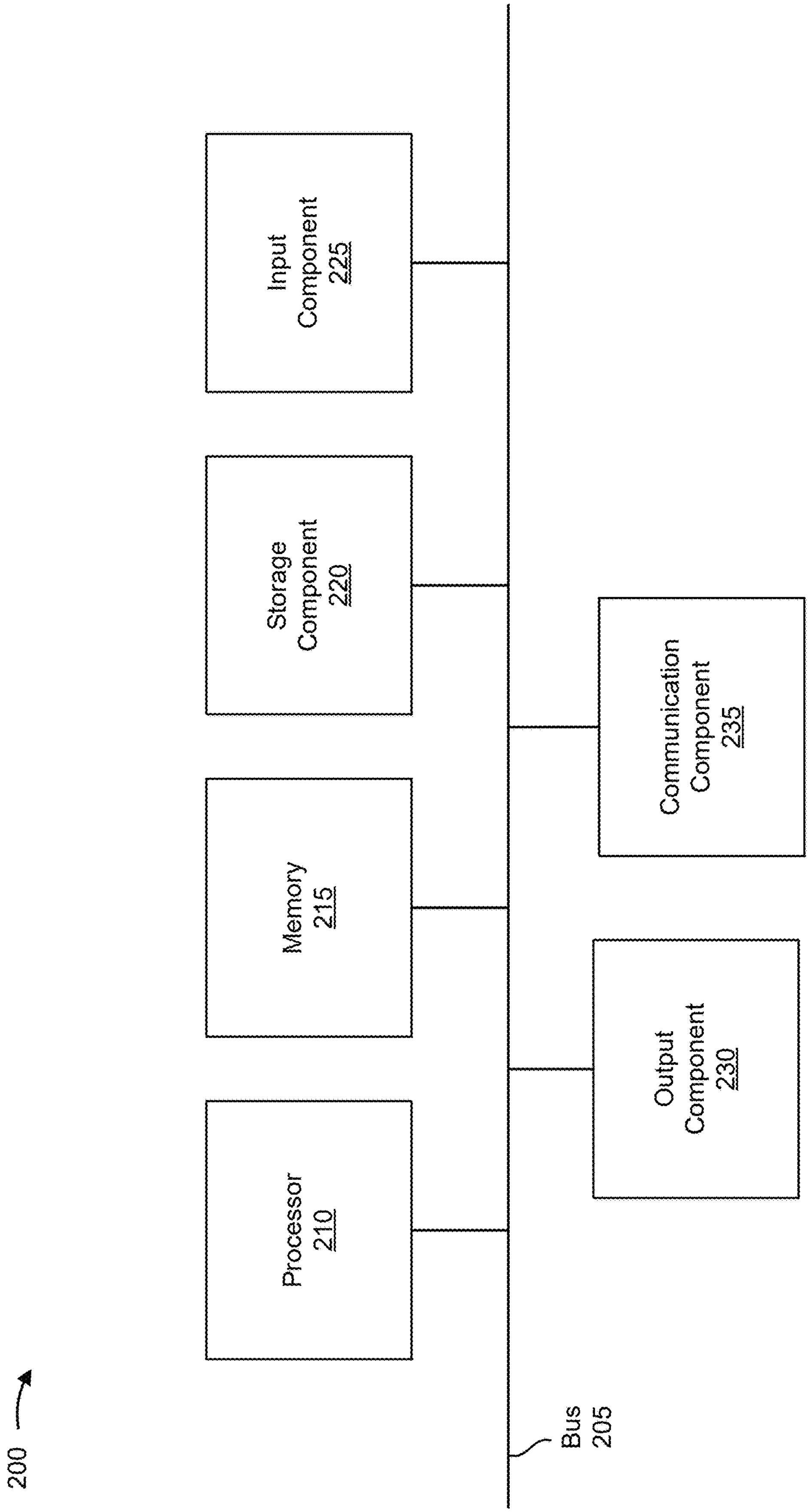
FIG. 2A is a diagram illustrating example components of a device, in accordance with aspects of the present disclosure.

FIG. 2A is a diagram illustrating example components of a device 200, in accordance with the present disclosure. As shown in FIG. 2A, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some cases, the antenna may be configured to emit continuous wave communications that can stimulate energy in an energy harvesting device (e.g., a remote tag, such as an RFID tag) such as energy harvesting device 240 shown in FIG. 2A. In some cases, the antenna may be configured to receive RFID communications from such an energy harvesting device.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2A are provided as an example. In practice, device 200 may include additional components, fewer components, different components, or differently arranged components than those shown in FIG. 2A. Additionally, or alternatively, a set of components (e.g., one or more components) of device 200 may perform one or more functions described as being performed by another set of components of device 200.

Figure 2B:
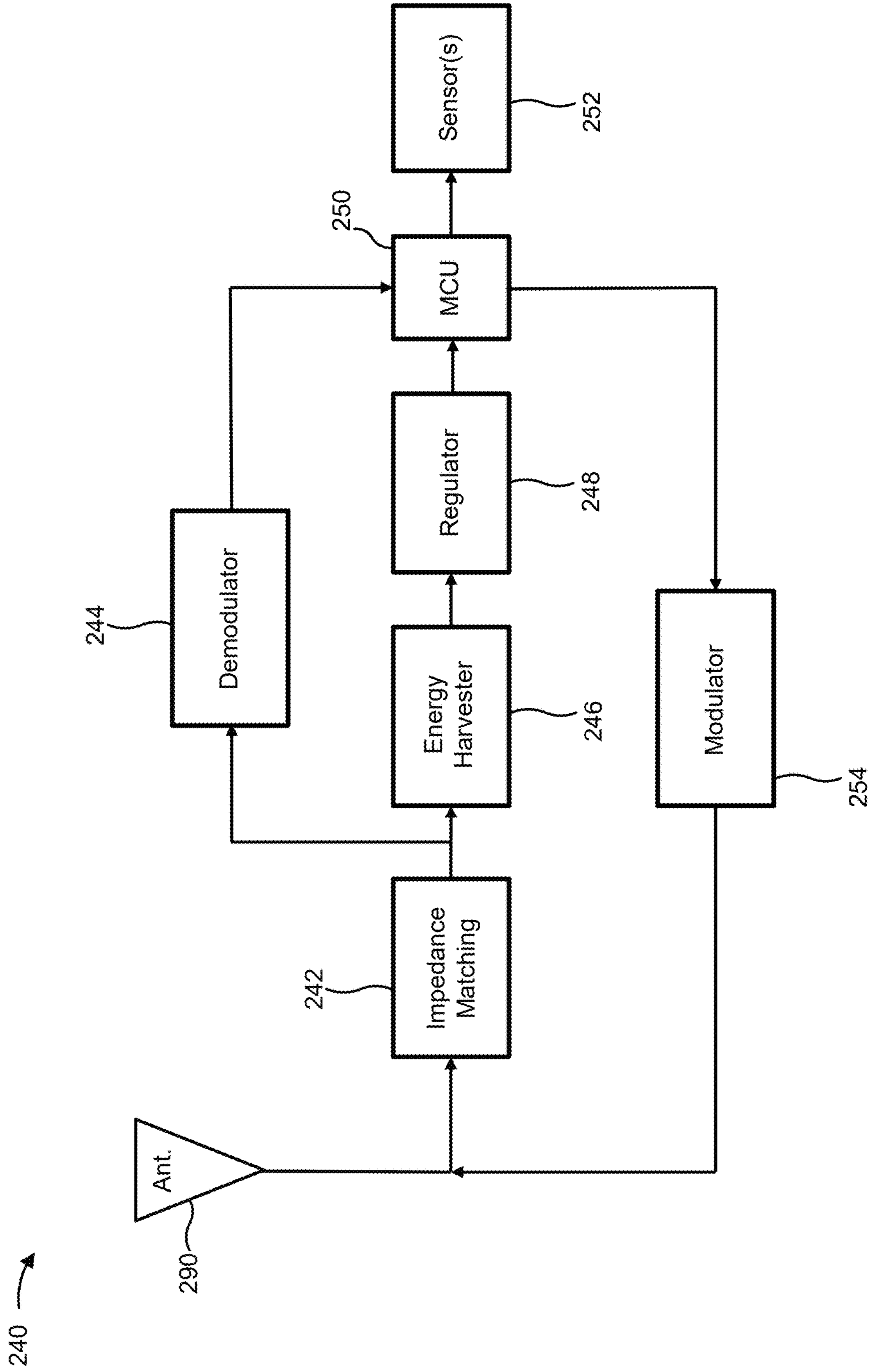
FIG. 2B is a diagram illustrating an example of a radio frequency (RF) energy harvesting device, in accordance with aspects of the disclosure.

FIG. 2B is a diagram illustrating an example of an architecture of a radio frequency (RF) energy harvesting device 240, in accordance with some examples. As will be described in greater depth below, the RF energy harvesting device 240 can harvest RF energy from one or more RF signals received using one or more antennas 290. As used herein, the term "energy harvesting" may be used interchangeably with "power harvesting." In some aspects, energy harvesting device 240 can be implemented as an Internet-of-Things (IoT) device, can be implemented as a sensor, etc., as will be described in greater depth below. In other examples, energy harvesting device 240 can be implemented as a remote tag (e.g., a Radio-Frequency Identification (RFID) tag or various other RFID devices).

The energy harvesting device 240 includes the one or more antennas 290 that can be used to transmit and receive one or more wireless signals. For example, energy harvesting device 240 can use antenna(s) 290 to receive one or more downlink signals and to transmit one or more uplink signals. An impedance matching component 242 can be used to match the impedance of antenna(s) 290 to the impedance of one or more (or all) of the receive components included in energy harvesting device 240. In some examples, the receive components of energy harvesting device 240 can include a demodulator 244 (e.g., for demodulating a received downlink signal), an energy harvester 246 (e.g., for harvesting RF energy from the received downlink signal), a regulator 248, a micro-controller unit (MCU) 250, a modulator 254 (e.g., for generating an uplink signal). In some cases, the receive components of energy harvesting device 240 may further include one or more sensors 252.

The downlink signals can be received from one or more transmitters. For example, energy harvesting device 240 may receive a downlink signal from a network node or network entity that is included in a same wireless network as the energy harvesting device 240. In some cases, the network entity can be a base station, gNB, etc., that communicates with the energy harvesting device 240 using a cellular communication network. For example, the cellular communication network can be implemented according to the 3G, 4G, 5G, 6G, and/or other cellular standard (e.g., including future standards such as 6G and beyond).

In some cases, energy harvesting device 240 can be implemented as a passive or semi-passive energy harvesting device (e.g., an ambient energy harvesting device), which can perform passive uplink communication by modulating and reflecting a downlink signal received via antenna(s) 290. For example, passive and semi-passive energy harvesting devices may be unable to generate and transmit an uplink signal without first receiving a downlink signal that can be modulated and reflected. In other examples, energy harvesting device 240 may be implemented as an active energy harvesting device, which utilizes a powered transceiver to perform active uplink communication. An active energy harvesting device is able to generate and transmit an uplink signal without first receiving a downlink signal (e.g., by using an on-device power source to energize its powered transceiver).

Figure 3:
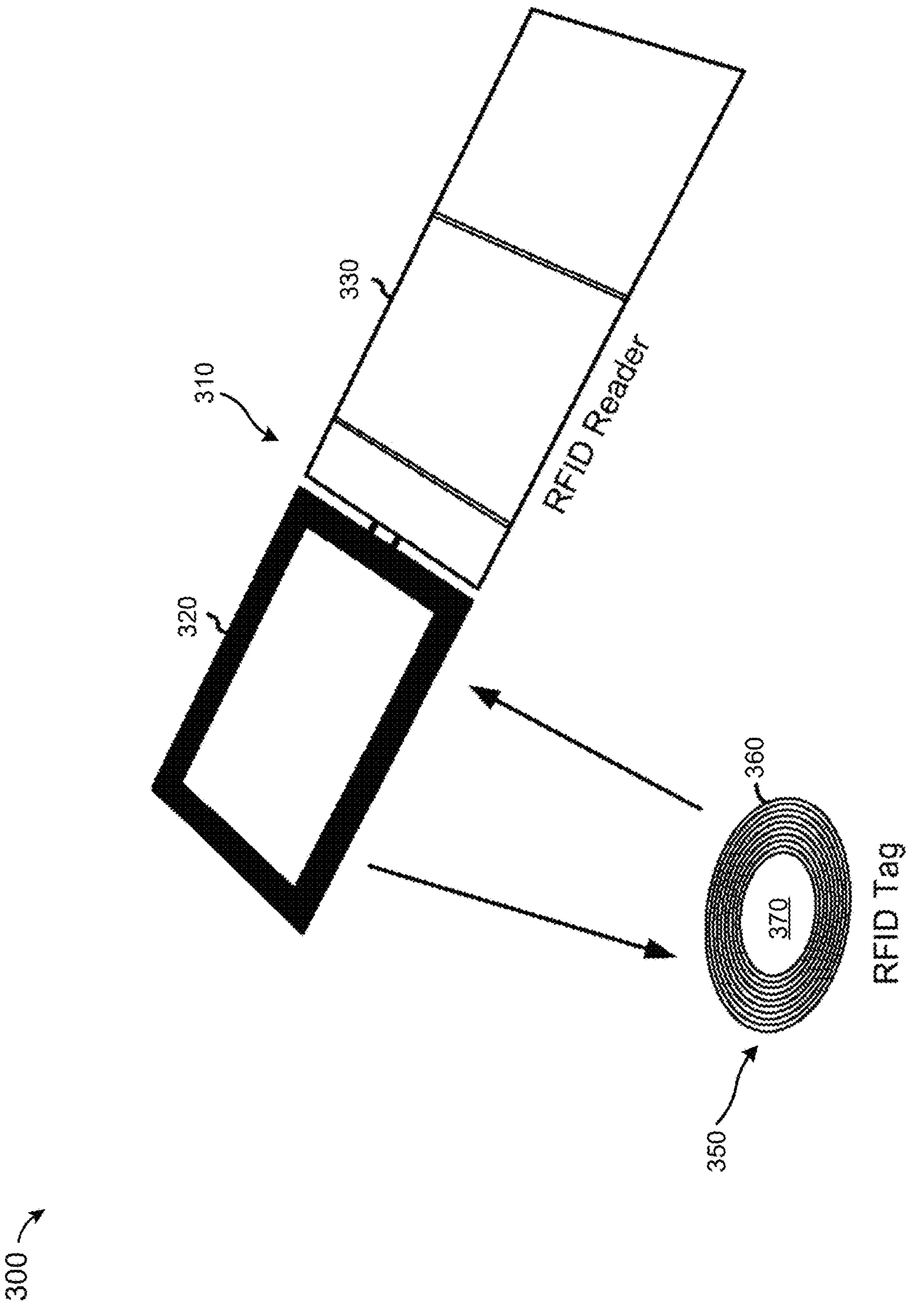
FIG. 3 is a diagram illustrating an example of a remote reading system (e.g., a radio frequency identification (RFID) system), in accordance with aspects of the present disclosure.

FIG. 3 is a diagram illustrating an example remote reading system 300 that includes a remote reader 310 and a remote tag 350. In some aspects, the remote reader 310 can be an RFID reader and the remote tag 350 can be an RFID tag. The remote tag reader 310 may also be referred to as an interrogator, a scanner, an energizer, etc. The remote tag 350 may also be referred to as an RFID label, an electronics label, etc.

The remote tag reader 310 includes an antenna 320 and an electronics unit 330. Antenna 320 radiates signals transmitted by remote tag reader 310 and receives signals from remote tags (e.g., such as the remote tag 350), such as RFID tags, and/or other devices. Electronics unit 330 may include a transmitter and a receiver for reading remote tags (e.g., RFID tags) such as remote tag 350. The same pair of transmitter and receiver (or another pair of transmitter and receiver) may support bi-directional communication with wireless networks, wireless devices, etc. In some examples, a first remote tag reader (e.g., a first RFID reader) can include a transmitter for energizing one or more remote tags (e.g., RFID tags), and a second remote tag reader (e.g., a second RFID reader) can include a receiver for receiving the reflected signals from the one or more remote tags. For instance, a remote tag reader can be configured to implement energizing and tag reading capabilities (e.g., includes a transmitter and a receiver), can be configured to implement energizing capabilities (e.g., includes a transmitter), and/or can be configured to implement tag reading capabilities (e.g., includes a receiver). The electronics unit 330 may include processing circuitry (e.g., a processor) to perform processing for data being transmitted and received by remote tag reader 310.

The remote tag 350 includes an antenna 360 and a data storage element 370. Antenna 360 radiates signals transmitted by remote tag 350 and receives signals from remote tag reader 310 and/or other devices. For instance, remote tags (e.g., RFID tags) can be passive, active, or semi-active. Passive remote tags utilize the interrogating signal from a remote tag reader (e.g., an RFID reader) to power a transmission by or from the remote tag (e.g., RFID tag). Active and semi-active remote tags (e.g., active and semi-active RFID tags) can include a power source or battery, which can be used to power a transmission by or from the remote tag. In some examples, the remote tag 350 may be a passive remote tag having no battery. In this case, a magnetic field from a signal transmitted by remote tag reader 310 (e.g., an energizing or interrogating signal from the remote tag reader 310) may induce an electrical current in remote tag 350, which may then operate based on the induced current. The remote tag 350 can radiate its signal in response to receiving a signal from remote tag reader 310 or some other device.

The remote tag 350 can use the data storage element 370 to store identification information corresponding to the remote tag 350 and/or corresponding to an item associated with the remote tag 350 (e.g., an item to which the remote tag 350 is attached, etc.). For example, data storage element 370 can be used to store identification information using various granularity levels for tracking and management of a remote tagged item (e.g., an RFID tagged item). A remote tag attached to a respective item, or attached to a group of items, may store corresponding information thereof. For example, the remote tag 350 can be configured to store, using data storage element 370, identification information corresponding to the item(s) to which the remote tag 350 is attached and associated. For instance, remote tag information (e.g., RFID tag information) can include one or more of a product name, a serial number, product information, a manufacturer, etc. In some examples, the remote tag 350 can store (e.g., using the data storage element 370) identification information that is directly indicative of a tagged item, product, object, etc. For instance, the remote tag 350 can store identification information such as a unique product serial number, etc. In some examples, the remote tag 350 does not store product or item identification information directly, and stores a unique remote tag serial number or identification number (e.g., unique RFID tag serial number or identification number) corresponding to the remote tag 350, which may be externally mapped to various item identification information such as product serial numbers, product names, product SKUs, etc.

Data storage element 370 can be configured to store identification information for remote tag 350, e.g., in an electrically erasable programmable read-only memory (EEPROM). The remote tag 350 may also include an electronics unit that can process the received signal and generate the signals to be transmitted.

The remote tag 350 may be read as follows. remote tag reader 310 may be placed or moved within close proximity to remote tag 350. remote tag reader 310 may radiate a first signal (which is also called an interrogation signal) via its antenna 320. The energy of the first signal may be coupled from remote tag reader antenna 320 to remote tag antenna 360 via magnetic coupling and/or other phenomena. The remote tag 350 may receive the first signal from remote tag reader 310 via antenna 360 and, in response, may radiate a second signal (which is also referred to as a responding signal) comprising the information stored in data storage element 370. remote tag reader 310 may receive the second signal from remote tag 350 via antenna 320 and may process the received signal to obtain the information sent in the second signal.

RFID system 300 may be designed to operate at various frequencies and/or frequency ranges. For example, RFID system 300 can operate at 900 MHz, within a range of 860-960 MHz, etc., among various other example frequencies and/or frequency ranges of RFID operations. remote tag reader 310 may have a specified maximum transmit power level, which may be imposed by the Federal Communication Commission (FCC) in the United Stated or other regulatory bodies in other countries. In some examples, the remote tag 350 can include a capacitor, battery, or other power source to provide power after continuous wave transmissions (or other transmissions powering the remote tag 350) have ceased. For example, the capacitor, battery, or other power source can allow operation of the remote tag 350 for greater than two seconds after continuous wave transmissions cease.

Figure 4:
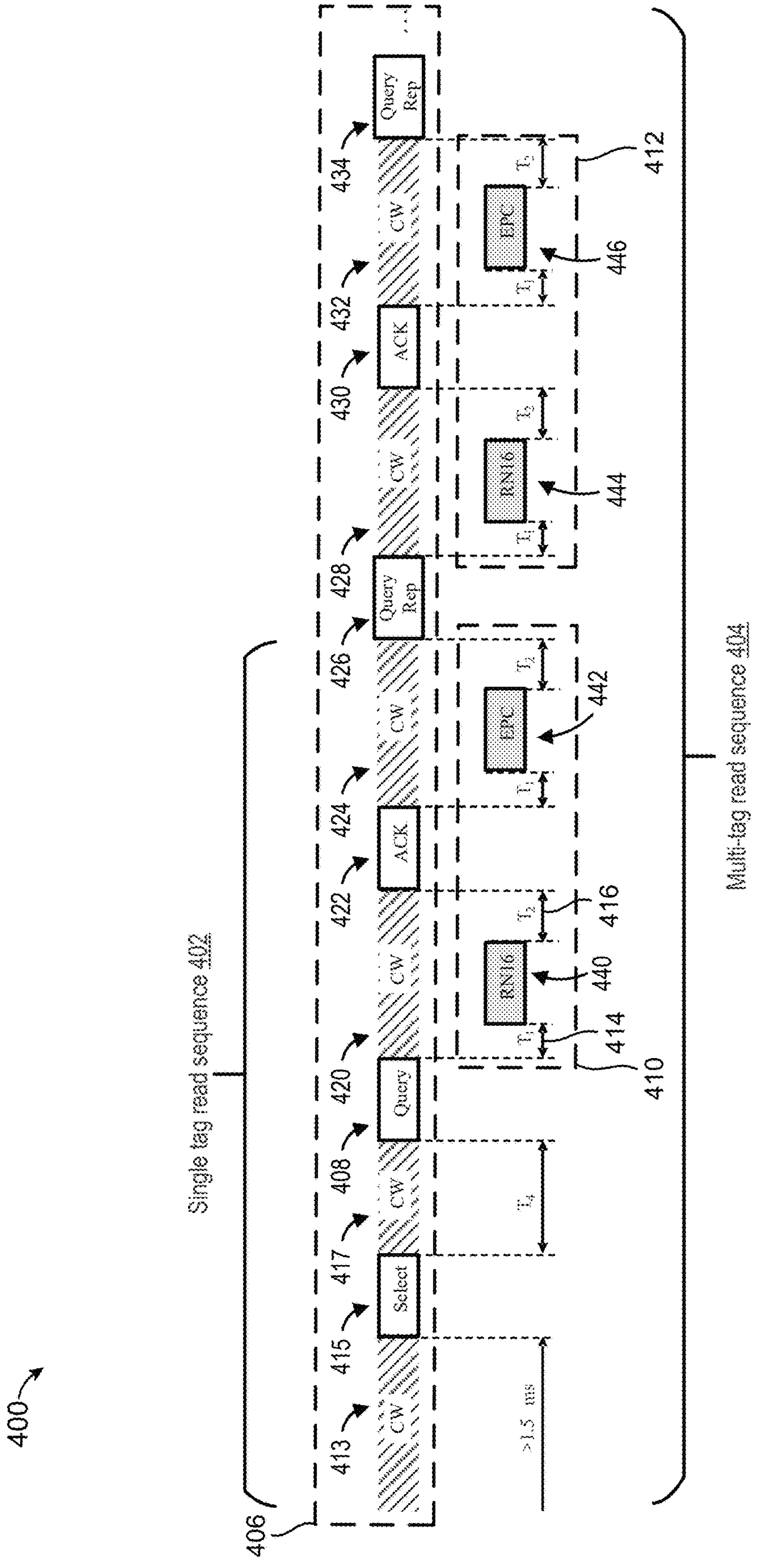
FIG. 4 is a block diagram illustrating an example inventorying process (e.g., a remote reading system inventory session) over a period of time, in accordance with aspects of the present disclosure.

FIG. 4 is a block diagram 400 illustrating an example inventorying process over a period of time for a single tag sequence 402 and a multi-tag sequence 404. The block diagram 400 illustrates an example of a remote tag reader 406 (e.g., an RFID reader) in communication with a plurality of remote tags (e.g., a first remote tag 410 and a second remote tag 412, such as first and second RFID tags). As shown, one or more remote tags (e.g., remote tag 410, remote tag 412, etc.) may be read in sequence. The block diagram 400 includes an example of a single tag sequence 402 and an example of a multi-tag sequence 404. As depicted, the single tag sequence 402 and the multi-tag sequence 404 both include a sequence of various transmissions and receptions. Sequences 402 and 404 are exemplary and, as such, multiple different variations are possible. The sequence 402 and the sequence 404 each include various continuous wave segments, during which a continuous wave is emitted via an antenna on a device (e.g., a reader device). The sequence 402 and the sequence 404 each also include various receive segments, during which the remote tag reader 406 can listen for transmissions from the one or more remote tags. The CW energizes any tags located within communications range of the device (e.g., the reader device), or if the tags are already energized, maintains the tags energized before the tags are read.

The single tag sequence includes continuous wave (CW) 413, select 415, CW 417, query 408, CW 420 (and RN16 message 444), Acknowledgement (ACK) 422, and CW 424 (and EPC message 442). In the single tag sequence, a reader device can use the sequence Query(T)→RN16(R)→ACK (T)→EPC (R) to read one tag, where "T" refers to the reader device transmitting and "R" refers to the reader device receiving (e.g., where the tag is transmitting). For instance, the reader device can first transmit a continuous wave (CW) 413. In the example depicted, the transmission time may be 1.5 milliseconds (ms), but other durations are also possible.

Continuing the example, the reader device can then transmit a Select (T)/Challenge (T) message 415 to one or more of the tags. The reader device can then transmit a second CW 417 (which may be the same CW as the CW 413) for a time T4. In response, a tag can emit the RN16 message 440, T1 time after a start of the transmission of the CW 420 and ending at T2 time prior to the end of the transmission of the CW 420. During this time, the reader device can continue to emit the CW 420. The reader device can respond with an ACK message 422. In response, the tag can emit an EPC message 442, while the reader device continues to emit the CW 424. The EPC message 442 can be emitted T1 time after the start of the transmission of the CW 424 and ending T2 time prior to the end of the transmission of the CW 424.

The Electronic Product Code (EPC) Radio-Frequency Identity Generation-2 Ultra High Frequency (UHF) RFID standard (e.g., an RFID specification) provides for a potentially short turnaround time for timers $T_1$ and $T_2$. This short turnaround time requires a need for substantial computational resources, in addition to at least one antenna for an RFID application. In some cases, meeting additional requirements may be required. Such requirements may include frequency-hopping spread spectrum (FHSS) signaling for UL signals in the United States (US), and a need to meet anti-jammer requirements in the European Union (EU).

The multi-tag sequence 404 includes the operations of single tag sequence, followed by one or more repetitions of parts of the single tag sequence 402, such as Query repeat (Rep) 426, CW 428, ACK 430, CW 432, Query Rep 434, RN16 message 444, and EPC message 446. More specifically, multi-tag sequence 404 includes messages QueryRep (T)→RN16(R)→ACK (T)→EPC (R) to read subsequent tags, which follows the initial message sequence, with a particular pre-defined timing cadence. These messages may be repeated, once for each additional tag.

A duration of the sequences depends upon a particular configuration that the reader device selects for transmitting and receiving data transmissions. In an example, a typical duration of the single tag sequence is from 1.2 to 50 ms. By contrast, the multi-tag sequence 404 generally can range as follows:

{1.2−50}+(a no_of_tags read)*{0.5-41}ms

In some cases, at least 1.5 ms may be needed to power up tags before sending any commands.

In one or more aspects, GS1 EPC Class1 Gen2 specifies a procedure for a reader device to extract EPCs from signals from multiple passive devices (e.g., RFID devices, such as tags). A slot counter is employed for this procedure. In one example, the remote tag reader 406 can generate a command such as query 408 to request a response from the first remote tag 410. In such an example, the remote tag reader 406 can transmit the query 408 to the plurality of remote tags. The first remote tag 410 can respond to the remote tag reader 406 with an immediate RF reply (e.g., a responsive RF wave) within the time period (e.g., or before a first time threshold 414, also referred to as $T_1$).

The first remote tag 410 can respond to the remote tag reader 406 within the first time threshold 414. For example, the first remote tag 410 can respond with an RN16 message or another responsive RF signal. The remote tag reader 406 can generate and transmit an acknowledgement (ACK) message in response to the message from the first remote tag 410 (e.g., by repeating the RN16 back to the first remote tag 410). The remote tag reader 406 can respond within a second time threshold 416 (e.g., $T_2$, also referred to as a second time period). $T_2$ can represent a time threshold before which the remote tag reader 406 should transmit a response to the first remote tag 410. In some examples, failure to transmit a response to the first remote tag 410 before expiration of $T_2$ can result in the first remote tag 410 entering an arbitrate state (e.g., an arbitration state) of the inventorying process. In the multi-tag sequence 404, the remote tag reader 406 can transmit a QueryRep command and continue the inventorying process with the second remote tag 412.

The first remote tag 410 and the second remote tag 412 can include non-transitory memory to store state variables of the remote tags (e.g., whether a remote tag has been inventoried). For example, the non-transitory memory can be local memory of the remote tag which can persist after a remote tag loses power from the remote tag reader 406. In such an example, the remote tag reader 406 can transmit an additional command after singulating a tag and after reading (or otherwise having access to) a remote tag manufacturer's identification (e.g., EPC) in the remote tag memory (e.g., an RFID tag manufacturer's identification, such as an EPC, in the RFID tag memory).

The additional command of the remote tag reader 406 can be used to store remote tag state information (e.g., state variables, state flags, selected flags, singulation flags, C flags, extensions to security time out persistence periods, etc.) in non-transitory memory of the remote tags. For example, remote tag state information (also referred to as remote tag context), such as remote tag state information or context, can be defined as information used by the remote tag to determine whether the remote tag has replied to the remote tag reader 406. The remote tag state information can include information such as an inventoried flag per session, selected (SL) flag, slot counter, handle, query command (cmd), etc.

In such an example, when the remote tag reader 406 resumes an inventorying process after pausing (e.g., tuning away for WWAN transmissions or other wireless signal transmissions) inventorying process, the remote tag reader 406 can transmit a command to the remote tags to indicate resumption of the inventorying process. The command for resuming the inventorying process can indicate a prior remote tag (e.g., prior RFID tag to be inventoried before the pause) and request remote tag state information from the remote tag. In such an example, the remote tag state information is stored in persistent memory of the remote tag (e.g., non-transitory memory) allowing the remote tag to retrieve the remote tag state information despite having lost power during the pause in transmission by the remote tag reader 406. In some examples, remote tags can automatically (e.g., upon receiving CW signal from the remote tag reader 406 when powering up the remote tag) load remote tag state information to transmit to the remote tag reader 406.

In another example, the first remote tag 410 and the second remote tag 412 transitory memory can be adjusted to persist for longer periods of time to accommodate losses in power to the remote tags for WWAN transmissions. In a further example, the remote tags can be adjusted to receive power from WWAN transmissions. In such an example, during a break in transmission of the CW signals, the first remote tag 410 and the second remote tag 412 can be powered by the WWAN transmissions (e.g., WWAN signals).

Figure 5A:
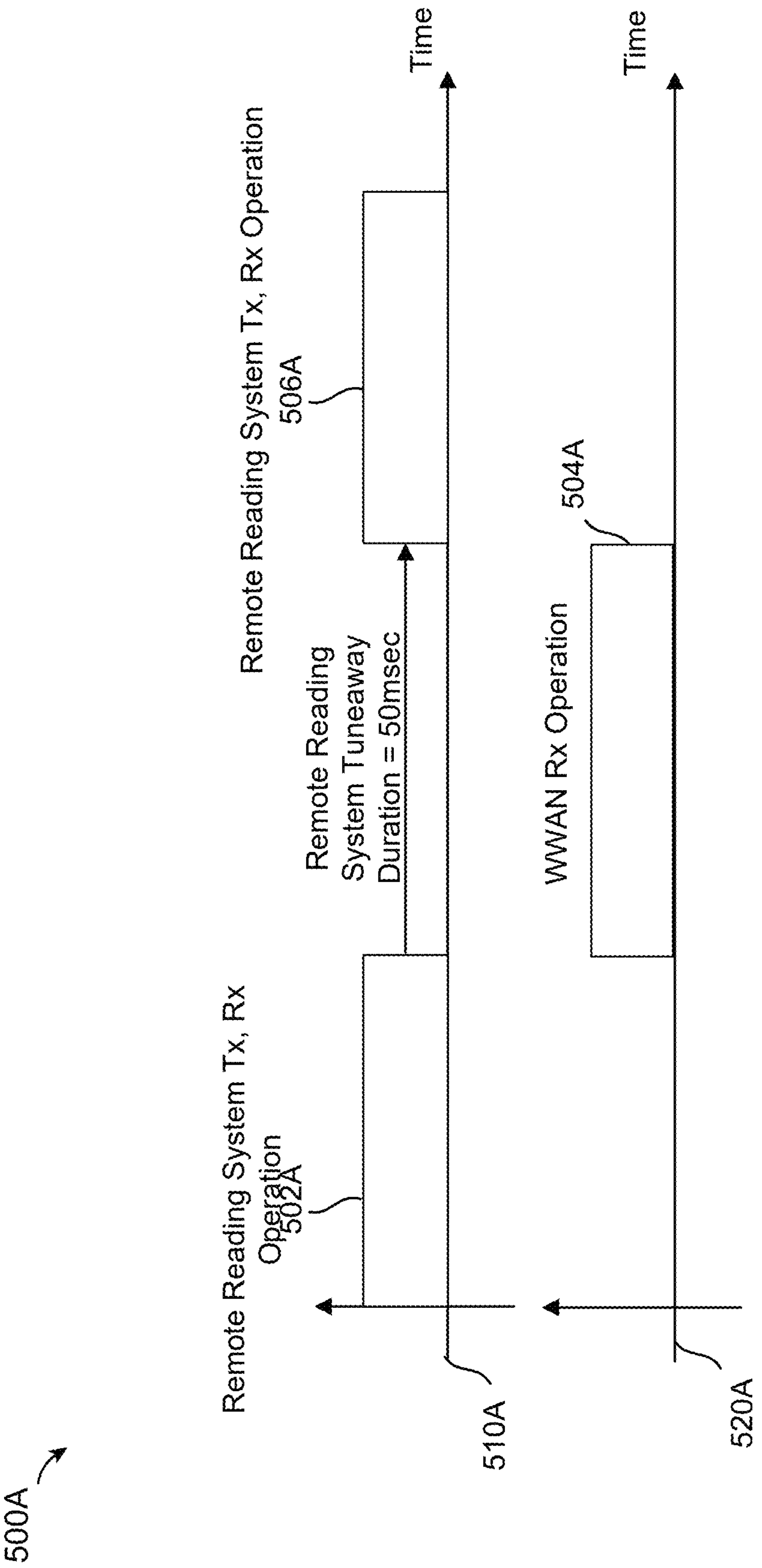
FIG. 5A-5C are block diagrams illustrating example scenarios with extended durations of state variables, in accordance with aspects of the present disclosure.
Figure 5B:
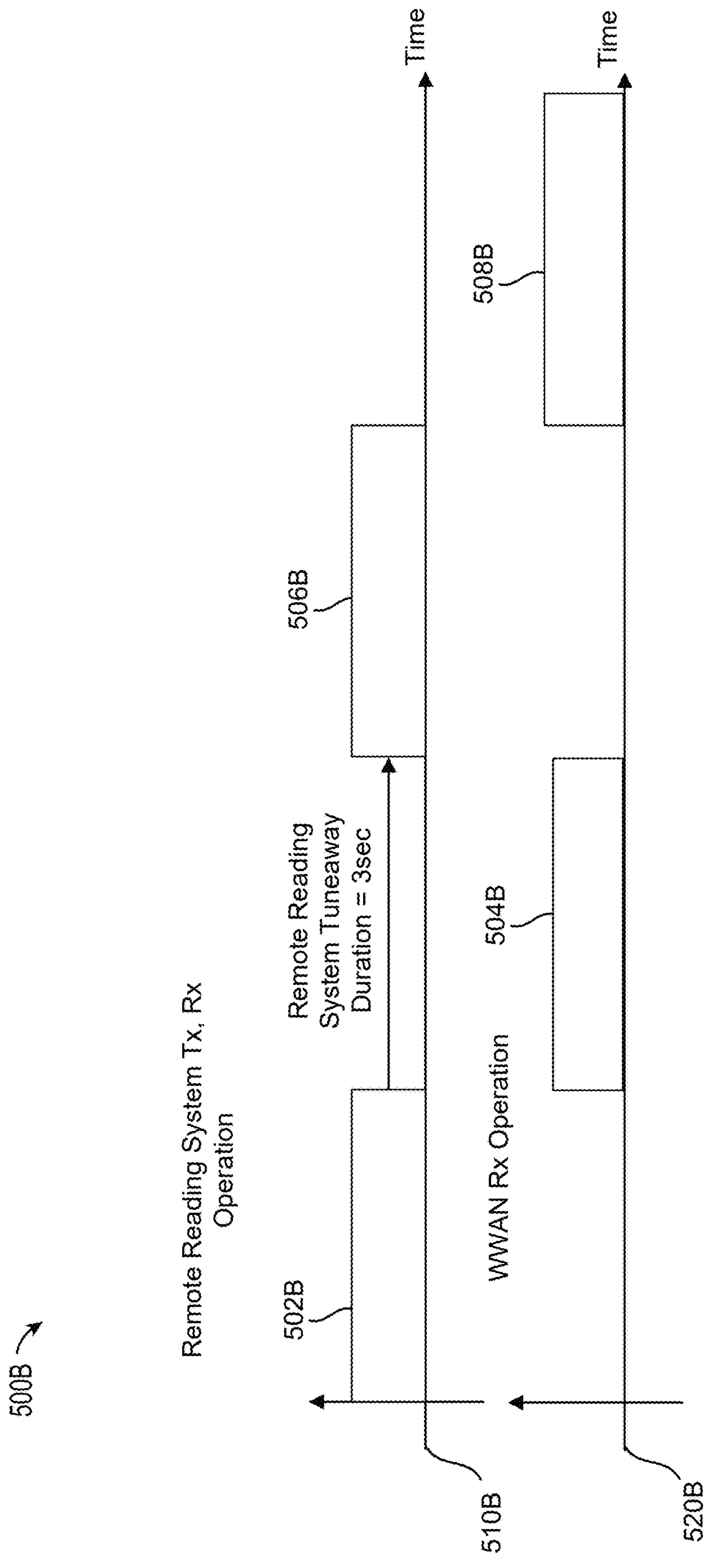
Figure 5C:
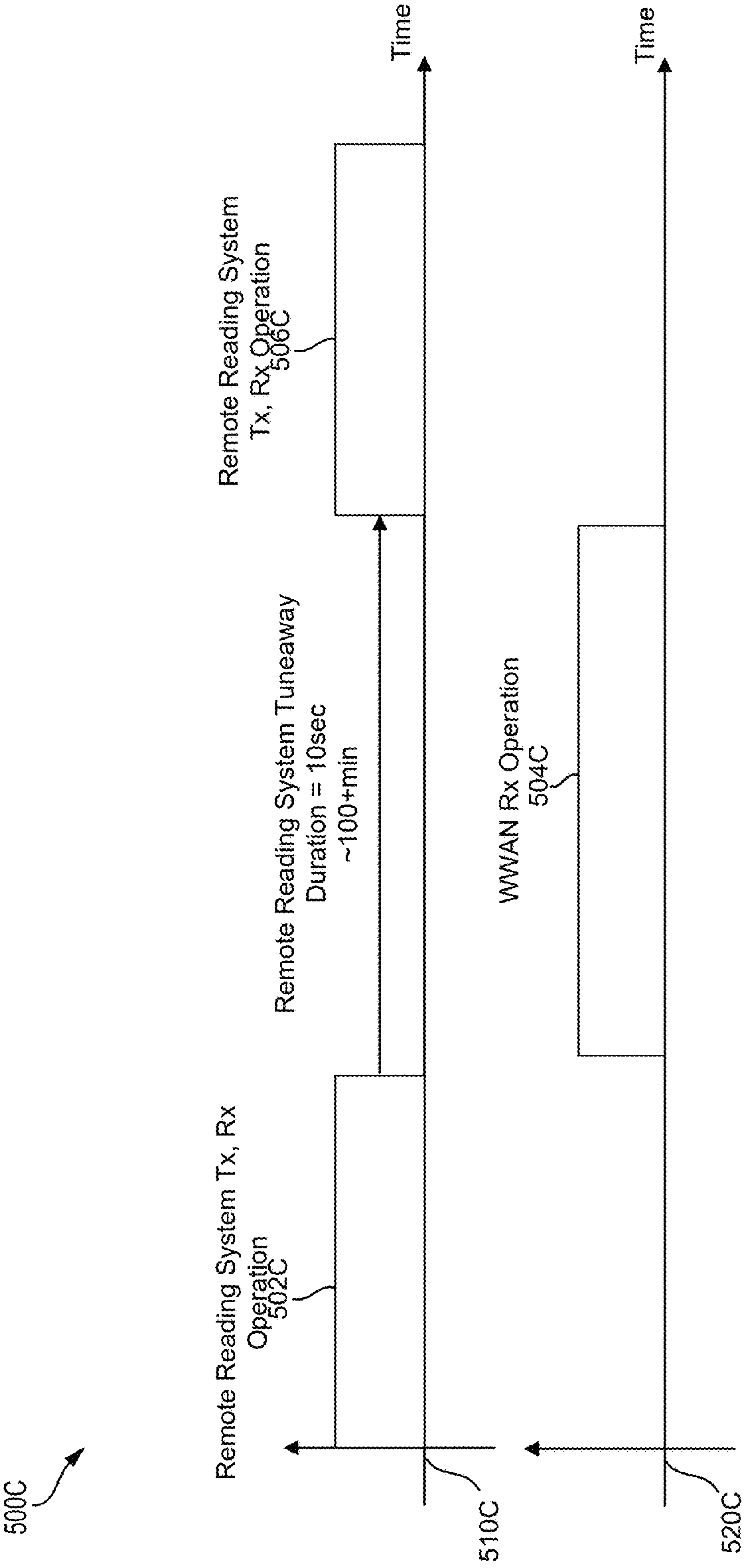

FIGS. 5A-5C are block diagrams illustrating example scenarios of when persistent memory (e.g., non-transitory memory) of remote tags (e.g., RFID tags) can be used to prevent duplicative inventorying actions after pausing transmission to the remote tags.

For example, FIG. 5A illustrates an example scenario 500A of a remote tag reader (e.g., an RFID reader) pausing inventorying processes, such as an RFID inventorying process for a particular tune away duration (e.g., for an RFID tune away duration of 50 milliseconds (ms)). FIG. 5A illustrates a first graph 510A representing CW signal output of a remote tag reader (e.g., an RFID reader) used to power one or more remote tags (e.g., one or more RFID tags) during inventorying processes. For example, time periods 502A and 506A represent time periods during which the remote tag reader outputs CW signals to power remote tags during inventorying. During time period 504A, the remote tag reader transitions from outputting CW signals to power remote tags to another frequency or communication standard as represented by a tune away duration (e.g., an RFID tune away duration) of the first graph 510A.

A second graph 520A represents signal output using a different frequency or communication standard. For example, the remote tag reader can be part of a mobile device such as a smartphone or tablet. In such an example, the smartphone can receive a text message or application notification causing a tune away period during which data is downloaded or uploaded using WWAN or other wireless communication technologies. Generally, disruptions in CW signal output can slow inventorying processes by causing remote tags which lose remote tag state information (e.g., RFID tag state information) after losing power to have to be inventoried again. In scenario 500A, the remote tags powered by the remote tag reader store remote tag state information in persistent memory avoiding duplicative inventorying actions due to WWAN transmissions during time period 504A. In some examples, instead of or in addition to storing remote tag state information in persistent memory, the remote tags can be adjusted to receive power WWAN transmissions. In such an example, when the remote tag reader pauses inventorying process for WWAN transmissions, the remote tag can remain powered on from the WWAN transmissions. In further examples, the remote tag can receive a command from the remote tag reader to store remote tag state information in persistent memory when the remote tag reader or electronic device including the remote tag reader transitions to WWAN transmissions.

FIG. 5B illustrates an example scenario 500B of a remote tag reader (e.g., an RFID reader) pausing inventorying processes (e.g., RFID inventorying processes) for longer durations than scenario 500A of FIG. 5A (e.g., 3 seconds as opposed to 50 ms). FIG. 5B includes a first graph 510B indicating CW signal output to remote tags (e.g., RFID tags) during time period 502B and 506B. FIG. 5B includes a second graph 520B indicating WWAN transmission during time periods 504B and 508B. In scenario 500B, the remote tag reader can be part of an electronic device, such as a smartphone or tablet connected to cellular services. In such an example, the smartphone or tablet can receive a text message with a file to download. During the download, the smartphone or tablet can pause the inventorying process by stopping output of a CW to power the remote tags. FIG. 5B illustrates that the remote reading system inventorying (e.g., RFID inventorying) can be paused and resumed. Many remote tags (e.g., RFID tags) lack the ability to remain in operation during a lapse in CW signals of 3 seconds. In scenario 500B, the remote tags can lose power, and when the CW signal output by the remote tag reader resumes, the remote tags can power on while retaining remote tag state information stored in persistent memory.

FIG. 5C illustrates an example scenario 500C of a remote tag reader (e.g., an RFID reader) pausing remote reading system inventorying processes (e.g., RFID inventorying processes) for longer durations than scenario 500A of FIG. 5A and scenario 500B of FIG. 5B (e.g., 10 seconds to 100 or more minutes). FIG. 5C includes a first graph 510C indicating CW signal output to remote tags during time period 502C and 506C. FIG. 5C includes a second graph 520C indicating WWAN transmission during time period 504C. In scenario 500C, the remote tag reader can be part of an electronic device, such as a smartphone or tablet connected to cellular services. In such an example, the smartphone or tablet can receive a phone call. During the phone call, the smartphone or tablet can pause the inventorying process by stopping output of a CW to power the remote tags. When the call ends, the smartphone or tablet can use the remote tag reader to resume the inventorying process.

In some examples, the remote tag reader can be configured to transmit commands to the remote tag indicating when the remote tag should store remote tag state information in persistent memory of the remote tag. For example, the remote tag reader can use custom interrogator to tag commands such as custom command codes, protection, and parameters reserved for manufacturer defined use in the EPC Gen2 standards. For purposes of a non-limiting example, a custom command for a remote tag to store remote tag state information in persistent memory can be 11100000 00000000. In another non-limiting example, a custom command for a remote tag to load remote tag state information from persistent memory (e.g., when inventorying resumes) can be 11100000 00000001. In some examples, the commands can be part of another command, such as part of Query or ACK command.

Figure 6:
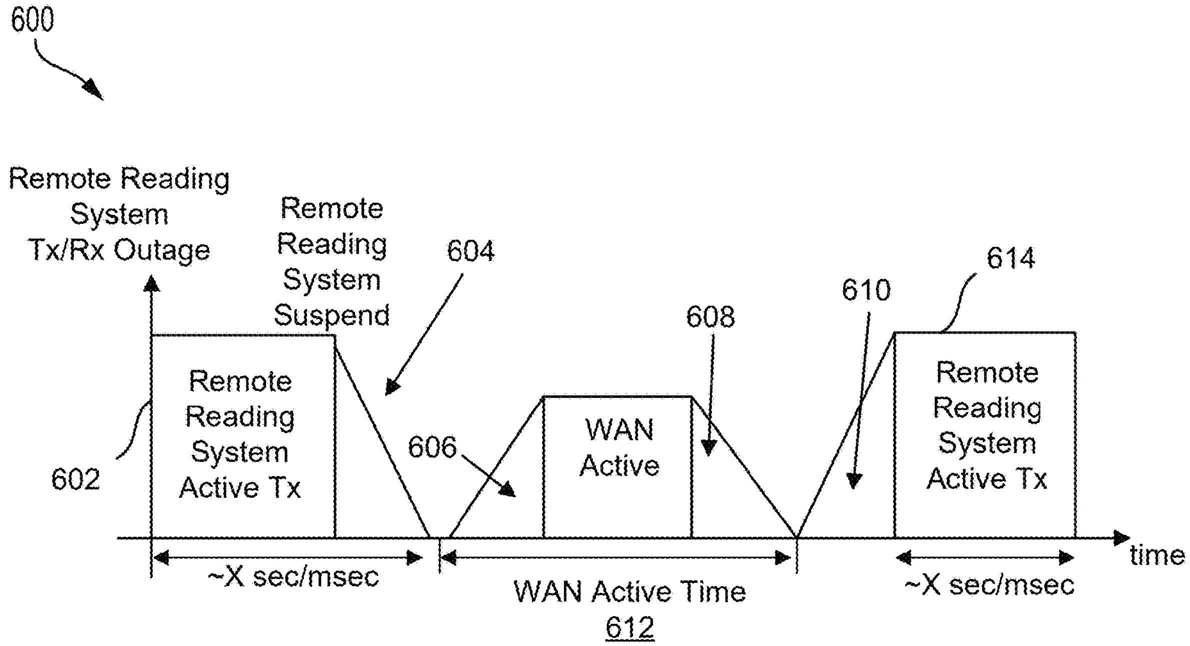
FIG. 6 is an example block diagram illustrating transitioning between wireless signals of a remote tag reader (e.g., an RFID reader), in accordance with aspects of the present disclosure.

FIG. 6 is a graph 600 illustrating an example of a remote tag reader (e.g., an RFID reader) or electronic device including the remote tag reader transitioning between WAN (or WWAN) and remote tag (e.g., RFID tag) transmissions (e.g., the CW for powering the remote tags). The graph 600 includes a remote reading system active transmission period (e.g., an RFID active transmission period), a remote reading system suspend period 604 (e.g., an RFID transmission suspend period or pause time), a WAN activation period 606, a WAN active period 612, a WAN suspend period 608, a remote reading system activation period 610 (an RFID activation period), and another remote reading system active transmission period (e.g., another RFID active transmission period).

The remote reading system active transmission period 602 (and another remote reading system active transmission period 614) can indicate a period of time when the remote tag reader is outputting a CW signal to power remote tags and perform inventorying operations. When the remote tag reader (or electronic device of which the remote tag reader is a part) determines to transmit WAN (or WWAN) signals, the remote tag reader can transmit a command to the remote tag to store remote tag state information during the remote reading system transmission suspend period 604.

The WAN activation period 606 can represent period of time for starting WAN transmissions. For example, at the start of the WAN activation period 606, a WAN signal is output instead of a CW signal to power the remote tags. The WAN activation period 606 can represent a time period where WAN signals are output by an electronic device (e.g., the remote tag reader or another component of the electronic device configured to output WAN signals). For example, the WAN activation period 606 can represent a period of time when a user is on a phone call, streaming a video on the internet, etc. When the electronic device, or component thereof, determines to resume inventorying operations (or other operations communicating with remote tags), the electronic device can transition back to performing inventorying by winding down WAN signal transmission during the WAN suspend period 608. The remote tag reader can begin outputting a CW signal to power the remote tags during the remote reading system activation period. The remote tag reader can resume or restart the inventorying process during another remote reading system active transmission period 614.

Figure 7:
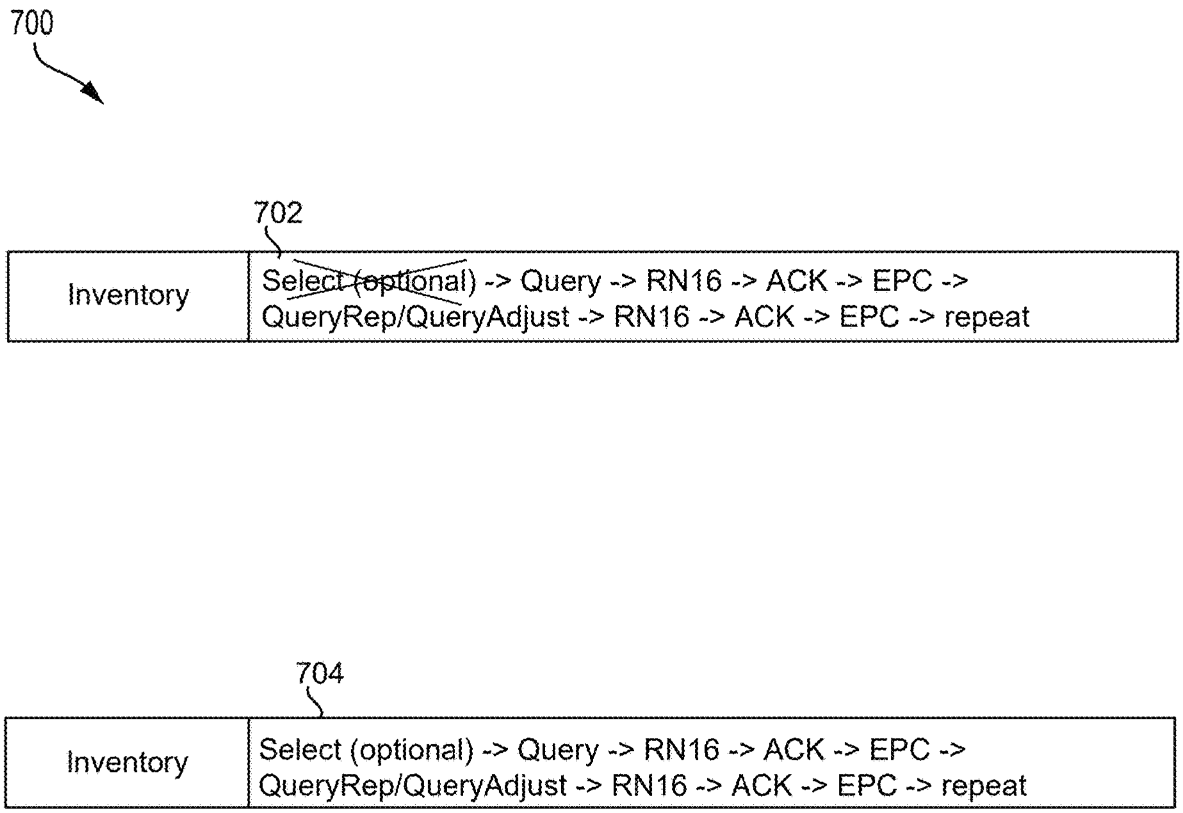
FIG. 7 is a block diagram illustrating example commands generated by a remote tag reader (e.g., an RFID reader), in accordance with aspects of the present disclosure.

FIG. 7 is a block diagram illustrating example inventory commands 700 for communicating with remote tags (e.g., RFID tags) based on an amount of time of which remote reading system inventorying (e.g., RFID inventorying) was paused (e.g., paused for WAN or WWAN transmissions). The inventory commands 700 can be custom commands indicating whether a remote tag reader (e.g., an RFID reader) should restart the inventorying operations or should continue a past inventorying operation. The inventory commands can include a select command to indicate whether to restart inventorying. For example, the select command can be received by the remote tags to command the remote tags to restart the inventorying process. When the select command is not present within a command after inventorying resumes, the remote tags can continue the inventorying operations performed by the remote tags and the remote tag reader prior to the pause.

For example, when the time period for pausing remote reading system inventorying is less than a predetermined threshold, the remote tag reader can transmit inventory command 702. The inventory command 702 does not include the select command. The predetermined threshold can be based on the remote tags to be inventoried. For example, when the remote tags to be inventoried are not configured to store remote tag state information in persistent memory, the predetermined threshold can be based on a length of time the remote tags remain active after the remote tag reader ceases outputting a CW signal to power the remote tags (e.g., 2 seconds, 2.5 seconds, 3 seconds, etc.).

In another example, when the time period for pausing remote reading system inventorying is greater than or equal to a predetermined threshold, the remote tag reader can transmit inventory command 704. Inventory command 704 includes a select command. The remote tags can reset remote tag state information based on the select command and the remote tag reader can restart the inventorying process. In a further example, the inventory command 704 can include a command for remote tags not read to maintain a random RN16 value. In such an example, the inventorying process can be resumed directly with a command such as a QueryRep command.

Figure 8:
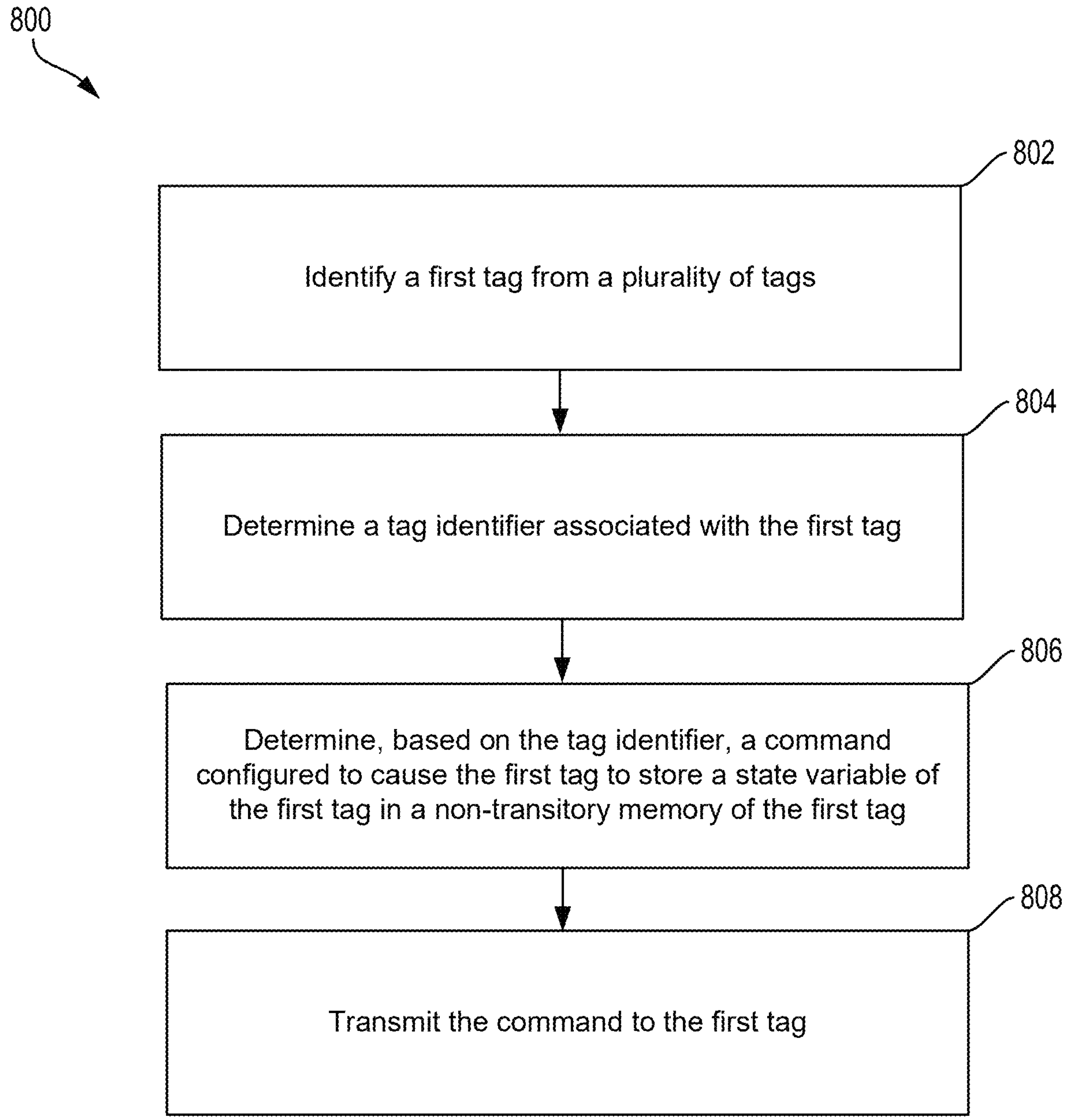
FIG. 8 is a flowchart diagram illustrating an example of a process for wireless communications, in accordance with aspects of the present disclosure.

FIG. 8 is a flow diagram illustrating an example process 800 for wireless communication. In particular, the process 800 illustrates an example process of inventorying remote tag (e.g., RFID tags), such as the remote tag 350 of FIG. 3 or the remote tags described in communication with a remote tag reader (e.g., an RFID reader) in the description of FIGS. 4-7. The process 800 can be performed by a computing device (e.g., the device 200 of FIG. 2A, the remote tag reader 310 of FIG. 3, the remote tag readers described in the descriptions of FIG. 4-7, the computing device or computing system 900 of FIG. 9, etc.) or by a component or system, a chipset, one or more processors central processing units (CPUs), digital signal processors (DSPs), graphics processing units (GPUs), any other type of processor(s), any combination thereof, or other component or system) of the computing device. The operations of the process 800 can be implemented as software components that are executed and run on one or more processors (e.g., processor 210 of FIG. 2A, the processor 910 of FIG. 9, or other processor(s)) of the computing device. Further, the transmission and reception of signals by the computing device in the process 800 can be enabled, for example, by one or more antennas and/or one or more transceivers (e.g., wireless transceiver(s)).

At block 802, the computing device (or component thereof) can identify a first tag from a plurality of tags. For example, the first tag and the plurality of tags can be remote tags (e.g., RFID tags, such as the remote tag 350 of FIG. 3 or the remote tags described in communication with a remote tag reader (e.g., an RFID reader) in the description of FIGS. 4-7. In some examples, the first tag can harvest energy (e.g., can be powered by) from continuous wave transmissions of the remote tag reader, such as the continuous waves (CW) provided by the remote tag reader 406 described in the description of FIG. 4. In further examples, the first tag is configured to harvest energy from at least one of a wide area network (WAN) or a wireless local area network (WLAN) transmission of a remote tag reader (e.g., an RFID reader), a WAN base station, or WLAN access point. For example, the first tag (and the plurality of tags) can be powered by a WAN transmission of a remote tag reader and/or a WAN base station or by a WLAN transmission of a WLAN access point. For instance, the remote tag reader can output various signals including a CW transmission and WAN transmissions. In some examples, the first tag can be powered by WAN transmissions. In further examples, the first tag can include a capacitor or battery source to provide power allowing operation of the first tag for time periods greater than two seconds after continuous wave transmissions (or WAN transmissions) from a remote tag reader ceases. In another example, the first tag can use WLAN AP DL Transmit RF Power to energize the tags. In a further example, the first tag can use WAN DL RF Power (such as using low-powered cellular radio access nodes such as small cells) to energize the first tag.

At block 804, the computing device (or component thereof) can determine a tag identifier associated with the first tag. For example, the tag identifier can be an identifying code or number associated with the first tag. In some examples, the tag identifier can indicate manufacturer of the tag, model of the tag, etc. For example, the tag identifier can include an EPC code. In some examples, the tag identifier can include information associated with the tag such as format of commands which can be received and performed by the tag. For example, the tag identifier can indicate which commands can be received (e.g., received from a remote tag reader or the computing device) and performed by the tag.

At block 806, the computing device (or component thereof) can determine, based on the tag identifier, a command configured to cause the first tag to store a state variable of the first tag in a non-transitory memory of the first tag. For example, the command can be the inventory commands 700 of FIG. 7. In some examples, the state variables can indicate whether the first tag has responded to the command. In such an example, the state variables can be or include bits with 0 indicating the first tag has not responded and 1 indicating the first tag has responded (or vice versa). In further examples, the state variable can include multiple flags. For example, the state variable can include at least one of an inventoried flag, a selected (SL) flag, a slot counter, a handle, or parameters of a query command.

At block 808, the computing device (or component thereof) can transmit the command to the first tag. For example, the computing device (or component thereof) can transmit the command using a remote tag reader, such as the remote tag reader 406 of FIG. 4. In some examples, the computing device (or component thereof) can determine whether the first tag has received the command. In such an example, the computing device (or component thereof) can determine the first tag has received the command based on a value of a flag or the state variables of the first tag. In further examples, the first tag can respond to the command with a reply. In one example, the computing device (or component thereof) can perform remote reading system inventory session (e.g., an RFID inventory session) to inventory the first tag without transmitting a select command based on a determination the first tag has received the command. In another example, the computing device (component thereof) can determine a suspend time of the remote reading system inventory session is less than a predetermined time threshold and resume the remote reading system inventory session based on the determination that the suspend time is less than the predetermined time threshold. In a further example, the computing device (or component thereof) can determine a suspend time of the remote reading system inventory session is greater than a predetermined time threshold. In such an example, the computing device (or component thereof) can restart the remote reading system inventory session based on the determination the suspend time of the remote reading system inventory session is greater than the predetermined time threshold.

In further examples, a user equipment (UE) handset can be enabled for WWAN and RFID operations. In such an example, the multi-functionality can allow the UE to be part of a portable electronic device such as a smartphone, tablet, laptop, etc. In another example, the computing device (or UE handset) can reduce procedure active time of remote tags during inventorying (e.g., a higher tag read rate) by reducing duplicative operations during inventory sessions. In such an example, the reduction of active time of remote tags during inventorying can reduce power usage. In such an example, the reduced power usage can result in improved battery life. Power usage efficiency can be improved based on the increase in persistence period reducing duplicative operations such as reducing duplicative replies of remote tags during inventory sessions.

Figure 9:
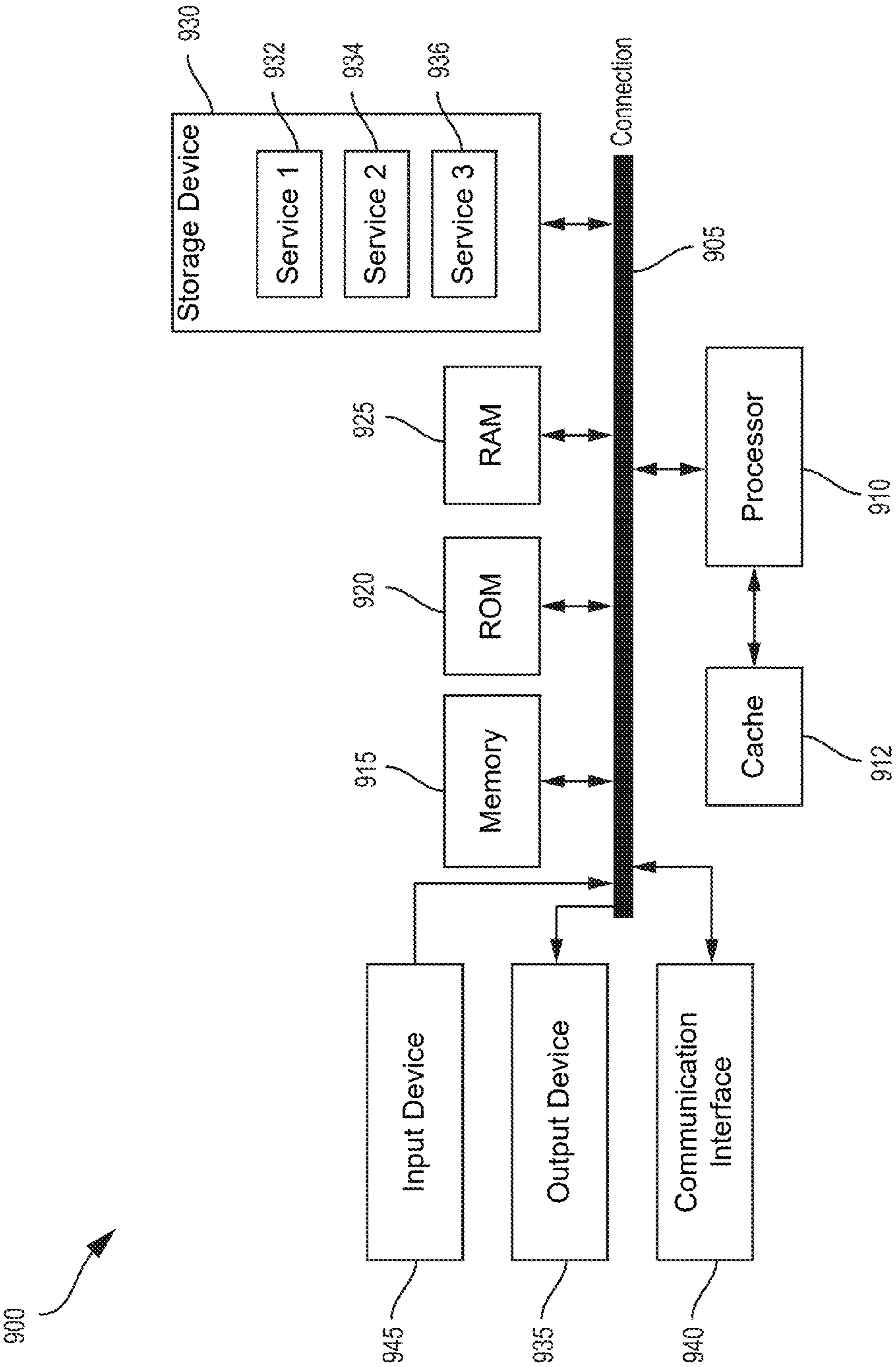
FIG. 9 is a block diagram illustrating example computing device architecture of an example computing device which can implement the various techniques described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, an engine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM)

such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the Present Disclosure Include:

Aspect 1. A method of wireless communication, the method comprising: identifying a first tag from a plurality of tags; determining a tag identifier associated with the first tag; determining, based on the tag identifier, a command configured to cause the first tag to store a state variable of the first tag in a non-transitory memory of the first tag; and transmitting the command to the first tag.

Aspect 2. The method of Aspect 1, further comprising: determining the first tag has received the command; and based on determining the first tag has received the command, performing a remote reading system inventory session to inventory the first tag without transmitting a select command.

Aspect 3. The method of any of Aspects 1 to 2, further comprising: determining a suspend time of the remote reading system inventory session is less than a predetermined time threshold; and resuming the remote reading system inventory session based on the determination that the suspend time is less than the predetermined time threshold.

Aspect 4. The method of any of Aspects 1 to 3, further comprising: determining a suspend time of the remote reading system inventory session is greater than a predetermined time threshold; and restarting the remote reading system inventory session based on determining the suspend time of the remote reading system inventory session is greater than the predetermined time threshold.

Aspect 5. The method of any of Aspects 1 to 4, wherein to determine the command based on the tag identifier, the method further comprises: determining a format of the command from data of the tag identifier.

Aspect 6. The method of any of Aspects 1 to 5, wherein the state variable indicates the first tag has responded to the command.

Aspect 7. The method of any of Aspects 1 to 6, wherein the state variable includes at least one of an inventoried flag, a selected (SL) flag, a slot counter, a handle, or parameters of a query command.

Aspect 8. The method of any of Aspects 1 to 7, wherein the first tag is powered by continuous wave transmissions of a remote tag reader.

Aspect 9. The method of any of Aspects 1 to 8, wherein the command is transmitted by a remote tag reader.

Aspect 10. The method of any of Aspects 1 to 9, wherein the first tag is configured to harvest energy from at least one of a wide area network (WAN) or a wireless local area network (WLAN) transmission of a remote tag reader, a WAN base station, or WLAN access point.

Aspect 11. The method of any of Aspects 1 to 10, wherein the first tag includes a capacitor or battery source providing operation of the first tag greater than two seconds after continuous wave transmissions from a remote tag reader ceases.

Aspect 12. A method of wireless communication, the method comprising: receiving a first command from a remote tag reader; transmitting, by a remote tag, a remote tag identifier based on the first command; and adjusting a state variable of the remote tag in a non-transitory memory of the remote tag based on a second command from the remote tag reader.

Aspect 13. An apparatus for wireless communication, the apparatus comprising: at least one memory; and at least one processor coupled to the at least one memory and configured to: receive a first command from a remote tag reader; transmit, by a remote tag, a remote tag identifier based on the first command; and adjust a state variable of the remote tag in a non-transitory memory of the remote tag based on a second command from the remote tag reader.

Aspect 14. An apparatus for wireless communication, the apparatus comprising: at least one memory; and at least one processor coupled to the at least one memory and configured to: identify a first tag from a plurality of tags; determine a tag identifier associated with the first tag; determine, based on the tag identifier, a command configured to cause the first tag to store a state variable of the first tag in a non-transitory memory of the first tag; and transmit the command to the first tag.

Aspect 15. The apparatus of Aspect 14, wherein the at least one processor is configured to: determine the first tag has received the command; and based on the determination that the first tag has received the command, perform a remote reading system (e.g., RFID) inventory session to inventory the first tag without transmitting a select command.

Aspect 16. The apparatus of any of Aspects 14 to 15, wherein the at least one processor is configured to: determine a suspend time of the remote reading system inventory session is less than a predetermined time threshold; and resume the remote reading system inventory session based on the determination that the suspend time is less than the predetermined time threshold.

Aspect 17. The apparatus of any of Aspects 14 to 16, wherein the at least one processor is configured to: determine a suspend time of the remote reading system inventory session is greater than a predetermined time threshold; and restart the remote reading system inventory session based on determining the suspend time of the remote reading system inventory session is greater than the predetermined time threshold.

Aspect 18. The apparatus of any of Aspects 14 to 17, wherein to determine the command based on the tag identifier, the at least one processor is configured to: determine a format of the command from data of the tag identifier.

Aspect 19. The apparatus of any of Aspects 14 to 18, wherein the state variable indicates the first tag has responded to the command.

Aspect 20. The apparatus of any of Aspects 14 to 19, wherein the state variable includes at least one of an inventoried flag, a selected (SL) flag, a slot counter, a handle, or a query command.

Aspect 21. The apparatus of any of Aspects 14 to 20, wherein the first tag is powered by continuous wave transmissions of a remote tag reader.

Aspect 22. The apparatus of any of Aspects 14 to 21, wherein the command is transmitted by a remote tag reader.

Aspect 23. The apparatus of any of Aspects 14 to 22, wherein the first tag is configured to harvest energy from at least one of a wide area network (WAN) or a wireless local area network (WLAN) transmission of a remote tag reader, a WAN base station, or WLAN access point.

Aspect 24. The apparatus of any of Aspects 14 to 23, wherein the first tag includes a capacitor or battery source providing operation of the first tag greater than two seconds after continuous wave transmissions from a remote tag reader ceases.

Aspect 25. A non-transitory computer-readable medium having stored thereon instructions that, when executed by at least one processor, cause the at least one processor to perform one or more of operations according to any of Aspects 1 to 12.

Aspect 26. An apparatus for wireless communication, the apparatus comprising one or more means for performing operations according to any of Aspects 1 to 12.

What is claimed is:

1. An apparatus of wireless communication, the apparatus comprising:

at least one memory; and at least one processor coupled to the at least one memory and configured to:

identify a first tag from a plurality of tags;

determine a tag identifier associated with the first tag, wherein the tag identifier indicates a command format supported by the first tag;

determine, based on the tag identifier, a command configured to cause the first tag to store a state variable of the first tag in a non-transitory memory of the first tag, wherein the command comprises the command format and is configured to cause remote tag state information associated with the state variable to be stored in persistent memory by the first tag across a loss of continuous wave power; and output the command for transmission to the first tag.

2. The apparatus of claim 1, wherein the at least one processor is configured to:

determine the first tag has received the command; and based on the determination that the first tag has received the command, perform a remote reading system inventory session to inventory the first tag without transmitting a select command.

3. The apparatus of claim 1, wherein the at least one processor is configured to:

determine a suspend time of a remote reading system inventory session is less than a predetermined time threshold; and resume the remote reading system inventory session based on the determination that the suspend time is less than the predetermined time threshold.

4. The apparatus of claim 1, wherein the at least one processor is configured to:

determine a suspend time of a remote reading system inventory session is greater than a predetermined time threshold; and restart the remote reading system inventory session based on the determination that the suspend time of the remote reading system inventory session is greater than the predetermined time threshold.

5. The apparatus of claim 1, wherein the state variable indicates the first tag has responded to the command.

6. The apparatus of claim 1, wherein the state variable includes at least one of an inventoried flag, a selected (SL) flag, a slot counter, a handle, C flag, or parameters of a query command.

7. The apparatus of claim 1, wherein the first tag is powered by the continuous wave power generated by continuous wave transmissions of a remote tag reader.

8. The apparatus of claim 1, wherein the command is transmitted by a remote tag reader.

9. The apparatus of claim 1, wherein the first tag is configured to harvest energy from at least one of a wide area network (WAN) or a wireless local area network (WLAN) transmission of a remote tag reader, a WAN base station, or WLAN access point.

10. The apparatus of claim 1, wherein the first tag includes a capacitor or battery source providing operation of the first tag greater than two seconds after the continuous wave power generated by continuous wave transmissions from a remote tag reader ceases.

11. An apparatus for wireless communication, the apparatus comprising:

at least one memory; and at least one processor coupled to the at least one memory and configured to:

receive a first command from a remote tag reader;

transmit, by a remote tag, a remote tag identifier based on the first command, wherein the remote tag identifier indicates a command format supported by the remote tag; and adjust a state variable of the remote tag in a non-transitory memory of the remote tag based on a second command from the remote tag reader, wherein the second command comprises the command format and is configured to cause remote tag state information associated with the state variable to be stored in persistent memory by the remote tag across a loss of continuous wave power.

12. The apparatus of claim 11, wherein the state variable indicates the remote tag has responded to the second command.

13. The apparatus of claim 11, wherein the state variable includes at least one of an inventoried flag, a selected (SL) flag, a slot counter, a handle, or a query command.

14. A method of wireless communication, the method comprising:

identifying a first tag from a plurality of tags;

determining a tag identifier associated with the first tag, wherein the tag identifier indicates a command format supported by the first tag;

determining, based on the tag identifier, a command configured to cause the first tag to store a state variable of the first tag in a non-transitory memory of the first tag, wherein the command comprises the command format and is configured to cause remote tag state information associated with the state variable to be stored in persistent memory by the first tag across a loss of continuous wave power; and transmitting the command to the first tag.

15. The method of claim 14, further comprising:

determining the first tag has received the command; and based on determining the first tag has received the command, performing a remote reading system inventory session to inventory the first tag without transmitting a select command.

16. The method of claim 15, further comprising:

determining a suspend time of the remote reading system inventory session is less than a predetermined time threshold; and resuming the remote reading system inventory session based on determining the suspend time is less than the predetermined time threshold.

17. The method of claim 15, further comprising:

determining a suspend time of the remote reading system inventory session is greater than a predetermined time threshold; and restarting the remote reading system inventory session based on determining the suspend time of the remote reading system inventory session is greater than the predetermined time threshold.

18. The method of claim 14, wherein the state variable indicates the first tag has responded to the command.

19. The method of claim 14, wherein the state variable includes at least one of an inventoried flag, a selected (SL) flag, a slot counter, a handle, or a query command.

20. The method of claim 14, wherein the first tag is powered by the continuous wave power generated by continuous wave transmissions of a remote tag reader.

* * * * *